United States Patent
Dick et al.

(10) Patent No.: US 10,121,461 B1
(45) Date of Patent: Nov. 6, 2018

(54) PROVIDING FEEDBACK ON MUSICAL PERFORMANCE

(71) Applicant: International Business Machines Corporation, Armonk, NY (US)

(72) Inventors: Adrian D. Dick, Southampton (GB); Doina L. Klinger, Winchester (GB); David J. Nice, Southampton (GB); Rebecca Quaggin-Mitchell, Botley (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/634,257

(22) Filed: Jun. 27, 2017

(51) Int. Cl.
   *G10H 1/00* (2006.01)
   *G09B 15/00* (2006.01)

(52) U.S. Cl.
   CPC .......... *G10H 1/0008* (2013.01); *G09B 15/00* (2013.01); *G10H 2210/066* (2013.01); *G10H 2210/091* (2013.01)

(58) Field of Classification Search
   CPC .......... G10H 1/0008; G10H 2210/066; G10H 2210/091; G09B 15/00
   USPC ....................................... 84/477 R
   See application file for complete search history.

(56) References Cited

U.S. PATENT DOCUMENTS

| | | | | |
|---|---|---|---|---|
| 3,894,186 A * | 7/1975 | Humphrey | ............... | G10L 21/06 704/276 |
| 4,024,789 A * | 5/1977 | Humphrey | ............. | G09B 15/04 434/185 |
| 4,042,789 A * | 8/1977 | Richards | ................ | H04Q 1/457 340/13.34 |
| 4,457,203 A * | 7/1984 | Schoenberg | ............. | G10G 7/02 324/76.47 |
| 4,523,506 A * | 6/1985 | Hollimon | ................. | G10G 7/02 324/76.57 |
| 4,690,026 A * | 9/1987 | McCoy | .................. | G10H 3/125 84/603 |
| 4,885,969 A * | 12/1989 | Chesters | .................. | G10C 3/12 84/423 A |
| 5,287,789 A * | 2/1994 | Zimmerman | .......... | G09B 15/00 84/454 |
| 5,563,358 A * | 10/1996 | Zimmerman | .......... | G09B 15/00 84/454 |
| 5,719,343 A * | 2/1998 | Reyburn | .................. | G10G 7/02 84/454 |
| 6,201,174 B1 * | 3/2001 | Eller | .................... | G09B 15/003 84/454 |
| 6,529,843 B1 * | 3/2003 | Carpenter | ................ | G10G 7/02 702/75 |

(Continued)

FOREIGN PATENT DOCUMENTS

| | | |
|---|---|---|
| WO | 2012146829 A1 | 11/2012 |
| WO | 2015092421 A1 | 6/2015 |
| WO | WO 2015092421 A1 * | 6/2015 ........... G09B 15/023 |

OTHER PUBLICATIONS

Appendix P List of IBM Patents or Applications Treated as Related. Dated Dec. 20, 2017. Two pages.

(Continued)

*Primary Examiner* — Elvin G Enad
*Assistant Examiner* — Christina Schreiber
(74) *Attorney, Agent, or Firm* — Stephen R. Yoder

(57) ABSTRACT

Providing feedback on a musical performance performed with a musical instrument. An instrument profile associated with the musical instrument used to perform the musical performance is identified. The instrument profile comprises information relating to one or more tuning characteristics of the instrument. The pitch of notes of the musical performance are analyzed based on the instrument profile to determine a measure of tuning of the musical performance. A feedback signal is generated based on the determined measure of tuning.

20 Claims, 8 Drawing Sheets

(56) References Cited

U.S. PATENT DOCUMENTS

| | | | |
|---|---|---|---|
| 7,674,970 B2 | 3/2010 | Ma et al. | |
| 8,294,016 B2* | 10/2012 | Franzblau | G09B 5/02 |
| | | | 84/470 R |
| 8,378,194 B2* | 2/2013 | Daisy | G09B 5/06 |
| | | | 84/470 R |
| 2003/0023421 A1* | 1/2003 | Finn | G06F 17/30743 |
| | | | 704/1 |
| 2008/0282872 A1* | 11/2008 | Ma | G10H 1/0575 |
| | | | 84/627 |
| 2013/0205975 A1* | 8/2013 | Williams | G09B 15/00 |
| | | | 84/465 |
| 2013/0215152 A1* | 8/2013 | Gibbon | G06T 11/60 |
| | | | 345/641 |
| 2014/0020546 A1* | 1/2014 | Sumi | G10H 1/0008 |
| | | | 84/609 |
| 2014/0041511 A1* | 2/2014 | Kaipainen | G09B 15/023 |
| | | | 84/465 |
| 2014/0140536 A1* | 5/2014 | Serletic, II | G06F 3/0481 |
| | | | 381/98 |
| 2016/0042657 A1* | 2/2016 | Granger | G09B 15/023 |
| | | | 84/477 R |
| 2016/0372097 A1* | 12/2016 | Rogers | G10H 1/44 |

OTHER PUBLICATIONS

Dick et al. Original U.S. Appl. No. 15/843,443, filed Dec. 15, 2017.

"Intonia" Internet Archive WayBack Machine <http://web.archive.org/web/20161018060041/http://intonia.com/index.shtml>. Oct. 18, 2016.

"InTune version 1.0—testing" 2009 Music Informatics/Human Computer Interaction School of Informatics Indiana University Bloomington USA <http://music.informatics.indiana.edu/programs/InTune/>.

Ferguson. "Learning Musical Instrument Skills Through Interactive Sonification". Proceedings of the 2006 International Conference on New Interfaces for Musical Expression (NIME06) Paris, France. pp. 6.

Schafer. "Trumpet Tuning Tendencies Relating to the Overtone Series with Solutions". <http://www.utc.edu/faculty/erika-schafer/musiceducatorresources/tuning.php> UTC website on Blackboard Learn 9.1 Q2 2016.

Schoonderwaldt et al. "IMUTUS-an interactive system for learning to play a musical instrument" . Apr. 14, 2014. <https://www.researchgate.net/publication/242313694>. pp.

Dick et al. Original U.S. Appl. No. 15/911,277, filed Mar. 5, 2017.

Appendix P List of IBM Patents Treated as Related. Dated Mar. 6, 2018. Two pages.

* cited by examiner

PROVIDING FEEDBACK ON MUSICAL PERFORMANCE

BACKGROUND

The present invention relates generally to the creation of music with a musical instrument, and, more particularly, to providing feedback to a student learning to play a musical instrument.

The present invention yet further relates to a system for providing feedback on a musical performance performed with a musical instrument.

A musical performer requires feedback on a musical performance performed with a musical instrument in order to understand which aspects of the performance and/or the performer's technique need to be altered in order to improve or address problems. Oftentimes, third-party feedback is relied upon when learning to play a musical instrument.

SUMMARY

Embodiments of the present invention disclose a method, a computer program product, and a computer system for providing feedback on a musical performance performed with a musical instrument. The method comprises of recording identifying an instrument profile associated with the musical instrument used to perform the musical performance, the instrument profile comprising information relating to one or more tuning characteristics of the instrument. The method also comprises of analyzing the pitch of notes of the musical performance based on the instrument profile to determine a measure of tuning of the musical performance and generating a feedback signal based on the determined measure of tuning.

DETAILED DESCRIPTION

Figure 1:
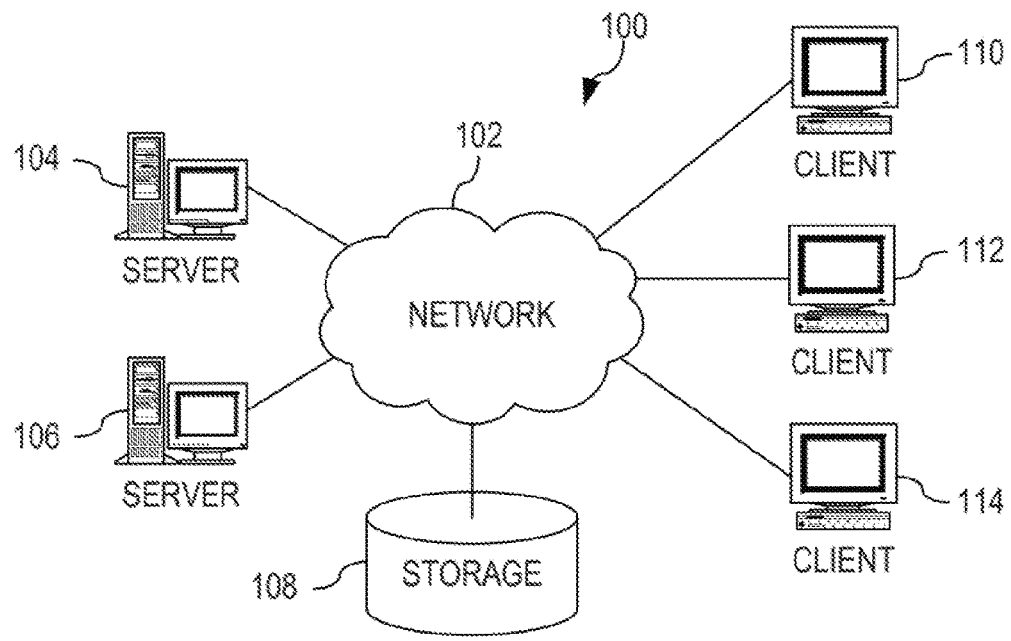
FIG. 1 depicts a pictorial representation of an example distributed system in which aspects of the illustrative embodiments may be implemented.

According to an embodiment of the present invention there is provided a computer-implemented method for providing feedback on a musical performance performed with a musical instrument. The method comprises identifying an instrument profile associated with the musical instrument used to perform the musical performance. The instrument profile comprises information relating to one or more tuning characteristics of the instrument. The method also comprises analyzing the pitch of notes of the musical performance based on the instrument profile to determine a measure of tuning of the musical performance. A feedback signal is generated based on the determined measure of tuning.

According to another embodiment of the present invention, there is provided a computer program product for providing feedback on a musical performance performed with a musical instrument. The computer program product comprises a computer readable storage medium having program instructions embodied therewith, the program instructions executable by a processing unit to cause the processing unit to perform a method according to an embodiment of the invention.

According to another aspect of the present invention, there is provided a processing system comprising at least one processor and the computer program product according to an embodiment. The at least one processor is adapted to execute the computer program code of said computer program product.

According to yet another aspect of the present invention, there is provided a system for providing feedback on a musical performance performed with a musical instrument. The system comprises a profile identification unit adapted to identify an instrument profile associated with the musical instrument used to perform the musical performance, the instrument profile comprising information relating to one or more tuning characteristics of the instrument. The system also comprises a music analysis unit adapted to analyze the pitch of notes of the musical performance based on the instrument profile to determine a measure of tuning of the musical performance. The system also includes a feedback unit adapted to generate a feedback signal based on the determined measure of tuning.

According to an aspect of the present invention, there is provided a system for providing feedback on a musical performance performed with a musical instrument. The system comprises a profile identification unit adapted to identify an instrument profile associated with the musical instrument used to perform the musical performance, the instrument profile comprising information relating to one or more tuning characteristics of the instrument; a music analysis unit adapted to analyze the pitch of notes of the musical performance based on the instrument profile to determine a measure of tuning of the musical performance; and a feedback unit adapted to generate a feedback signal based on the determined measure of tuning. For some embodiments of the present invention the musical instrument is a brass instrument, and wherein the instrument profile comprises information relating tuning characteristics of the brass instrument.

The present invention seeks to provide a method for providing feedback on a musical performance performed with a musical instrument.

The present invention further seeks to provide a computer program product including computer program code for implementing the method when executed on a processor of a data processing system.

The present invention yet further seeks to provide a processing system adapted to execute this computer program code.

The present invention also seeks to provide a system for providing feedback on a musical performance performed with a musical instrument.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Proposed is a concept for providing objective feedback to a performer on a musical performance they performed with a musical instrument.

By analyzing the pitch of notes of a musical performance based on an instrument profile, one or more aspects of the musical performance which are systematic or unique to the instrument may be identified. Feedback may then be provided which informs the performer about the musical performance in the context of the musical instrument used and/or a technique the performer is employing with the musical instrument. The feedback may comprise a visual, audible, or tactile signal for example, or a combination thereof.

Proposed embodiments may be based on a realization that problems with tuning may be systemic, e.g. the instrument is out of tune, there is a problem in technique used for/with a particular set of notes, or similar. Such problems may be predictable by instrument type and/or experience of the player/performer. It has also been realized that problems with tuning may depend on an environment within which the musical instrument is being played. For instance, it may be that when playing in a cold environment, the instrument may be out of tune at the beginning of the session and then, after a period of time, the instrument may be in tune (due to the instrument being played and warmed up for example). Embodiments may identify such systemic tuning issues and provide feedback relating to the identified issues, thereby potentially enabling a performer to adapt his/her tuning over a period of time.

Information about tuning characteristics, issues and/or nuances of a musical instrument may be provided in an instrument profile associated with the instrument. An instrument profile may therefore be a general instrument profile that is associated with all instances of a musical instruments. For example, there may be provided a general trumpet profile that comprises information about general tuning characteristics of a typical trumpet with respect to things like: (i) temperature of its surrounding environments; (ii) commonly out of tune notes for the instrument; (iii) a normal/typical stave range; (iv) pitch of notes above and/or below a stave range; (iv) warm-up time period; (v) pattern of notes requiring a particular valve combination and/or lip position (vii) mute presence (viii) type of mute. By way of another example, there may be provided a general woodwind profile that comprises information about general tuning characteristics of a typical woodwind instrument with respect to things like: (i) temperature of its surrounding environments; (ii) commonly out of tune notes for the instrument; (iii) a normal/typical stave range; (iv) pitch of notes above and/or below a stave range; (iv) warm-up time period (v) a set of out of tune notes associated with a missing part or incomplete assembly of the instrument. In another example, there may be provided a general string profile that comprises information about general tuning characteristics of a typical stringed instrument with respect to things like: (i) temperature of its surrounding environments; (ii) commonly out of tune notes for the instrument; (iii) a normal/typical stave range; (iv) pitch of notes above and/or below a stave range; (iv) warm-up time period (v) a set of out of tune notes indicative of an inexperienced player.

Alternatively, and/or additionally, an instrument profile may be a specific instrument profile that is associated with a particular instance or model of a musical instrument. For example, there may be provided a specific trumpet profile that comprises information about tuning characteristics of a specific instance, brand or model of trumpet with respect to things like: (i) temperature of its surrounding environments; (ii) commonly out of tune notes for the instrument; (iii) a normal/typical stave range; (iv) pitch of notes above and/or below a stave range; (iv) warm-up time period. In another example, there may be provided a specific violin profile that comprises information about tuning characteristics of a specific instance, brand or model of violin with respect to things like: (i) temperature of its surrounding environments; (ii) commonly out of tune notes for the instrument; (iii) a normal/typical stave range; (iv) pitch of notes above and/or below a stave range; (iv) warm-up time period (v) a set of out of tune notes indicative of an inexperienced player. In yet another example, there may be provided a specific reed-based instrument profile that comprises information about tuning characteristics of a specific instance, brand or model of reed-based instrument (such as a clarinet) with respect to things like: (i) temperature of its surrounding environments; (ii) commonly out of tune notes for the instrument; (iii) a normal/typical stave range; (iv) pitch of notes above and/or below a stave range; (iv) warm-up time period (v) position of mouthpiece (e.g. held far out or close in); (vi) angle of instrument; (vii) reed strength (e.g. hard, medium, or soft).

Based on an instrument profile, a musical performance may be analyzed so as to identify issues (such as a tuning problem or trend) and generate suggestions to the user about aspect of tuning and/or technique that may be improved upon. Embodiments may enhance such analysis of issues and/or generation of suggestions by accounting for the environment the musical instrument is being played in. For example, when playing the instrument in a cold room, correlations between the environment (e.g. cold room) and tuning may be identified and used to improve the accuracy of feedback.

Some embodiments of the present invention may enable the provision of feedback to a student while practicing a musical performance which does not need to be compared to a stored version of a desired or reference performance. In this way, even poor and/or random musical selections may be analyzed and given feedback on. Thus, the student may be musically inexperienced without an understanding of which aspects of musical performance need to be improved.

Some embodiments of the present invention may offer feedback to a performer on their performance without a need to compare the performance to a stored desired performance. In this way, the performer need not be required to perform a standard musical piece or exercise to a high level of competence in order to solicit meaningful feedback. Instead, the performer may be free to perform any musical piece without understanding a particular aspect of their performance that they may need to improve.

Embodiments may be implemented in a manner which provides instant or real-time feedback on a musical performance using a handheld or portable computing device such as a smartphone, laptop, smartwatch, or the like.

Accordingly, there may be provided an approach to analyzing a musical performance performed with a musical instrument which takes account of tuning issues that are specifically associated with the musical instrument, such as notes that are commonly out-of-tune for that instrument, or an impact of playing technique on particular notes.

Embodiments may also provide concepts for analysis of musical performances that facilitate the efficient assessment of numerous musical performances, all of which may be freeform musical performances which do not conform to reference or test performances.

By way of further example, embodiments may propose analysis and feedback concepts for musical performances performed with a brass instrument, such as a trumpet. Such concepts may base analysis of a musical performance on a tuning profile of the brass instrument relating to tuning characteristics and/or tuning issues. In this way, tuning traits of the brass musical instrument may be account for and used to identify tuning and/or technique issues in the musical performance.

Also, it is noted that, although embodiments are presented in the context of being applicable in the relation to musical performances performed with a brass instrument (such as a trumpet for example), applicability of the proposed concepts may extend to other instruments that have particular tuning characteristics (e.g. temperature dependent tuning, or commonly out-of-tune notes, etc.). For example, embodiments may be implemented in relation to musical performances with a stringed instrument, such as a guitar or violin for example. Other embodiments may be implemented in relation to musical performances with a woodwind instrument, such as a clarinet for example.

Some embodiments of the present invention provide concepts for analyzing a musical performance performed with a musical instrument and for providing feedback based on such analysis. Dynamic and/or flexible musical performance feedback concepts may therefore be provided by proposed embodiments.

Modifications and additional steps to a traditional musical performance assessment concepts and/or systems may also be proposed which may enhance the value and utility of the proposed concepts.

Figure 2:
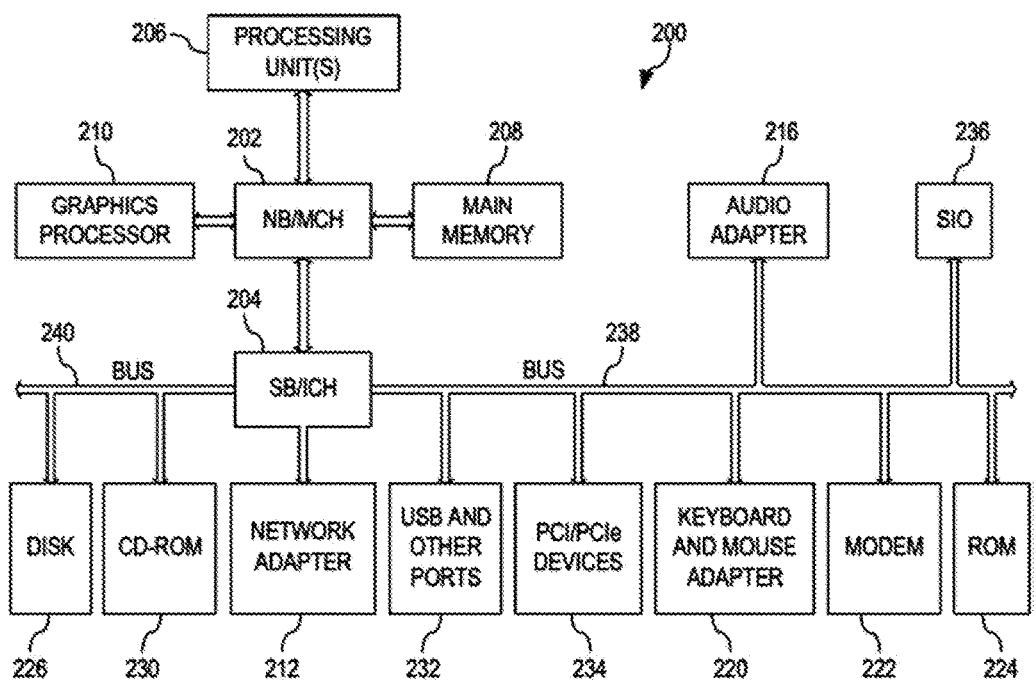
FIG. 2 is a block diagram of an example system in which aspects of the illustrative embodiments may be implemented.

Illustrative embodiments may be utilized in many different types of processing environments. In order to provide a context for the description of elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java programming system, may run in conjunction with the operating system and provides calls to the operating system from Java programs or applications executing on system 200. (Note: the term "Java" may be subject to trademark rights in various jurisdictions throughout the world and are used here only in reference to the products or services properly denominated by the marks to the extent that such trademark rights may exist.)

As a server, system 200 may be, for example, an IBM eServer System p computer system, running the Advanced Interactive Executive (AIX) operating system or the LINUX operating system. The system 200 may be a symmetric multiprocessor (SMP) system including a plurality of processors in processing unit 206. Alternatively, a single processor system may be employed. (Note: the terms "IBM", "eServer", "System p", "AIX", and/or "LINUX" may be subject to trademark rights in various jurisdictions throughout the world and are used here only in reference to the products or services properly denominated by the marks to the extent that such trademark rights may exist.)

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

A proposed concept may enhance musical performance feedback system by identifying an instrument profile associated with the musical instrument used to perform the musical performance and then analyzing the pitch of notes of the musical performance based on the identified instrument profile so as to determine a measure of tuning of the musical performance. Embodiments may enable tuning issues and/characteristics of the musical instrument to be identified (e.g. from an instrument profile associated with the instrument) and the tuning issues and/characteristics may then be used to analyze tuning of the musical performance. Such proposals can extend or improve the assessment and feedback capabilities of a musical performance feedback system.

For example, it has been realized that there are a number of common tuning issues when playing the trumpet, and proposed embodiments may take these into account when analyzing note of a musical performance to determine a measure of tuning of the musical performance. For instance, if analysis indicates that all notes are consistently sharp or flat, it may be determined that the overall tuning slide of the trumpet used for the musical performance is incorrect. Also, an algorithm used for the analysis may: (i) exclude notes that are commonly out of tune for trumpet performances; (ii) calculate an average pitch of the non-excluded notes (e.g. an average amount out of tune); and (iii) and then determine a measure of tuning based on the calculated average pitch (which may subsequently be used to make a suggestion to move the tuning slide of the trumpet in or out for example). By way of further example, analysis may be adapted to identify if higher notes (e.g. those above the stave) are sharp, compared to notes within the stave. If such higher notes are identified as being sharp, it may be determined that this suggests a technique issue where the player is pinching the lips too tightly to achieve the top notes and pulling them sharp. By way of yet another example, analysis may be adapted to identify if Low C# and D notes are sharp compared to other notes (which may, in turn, suggest that the player is not using the 3rd valve slide of the trumpet effectively.

Figure 3:
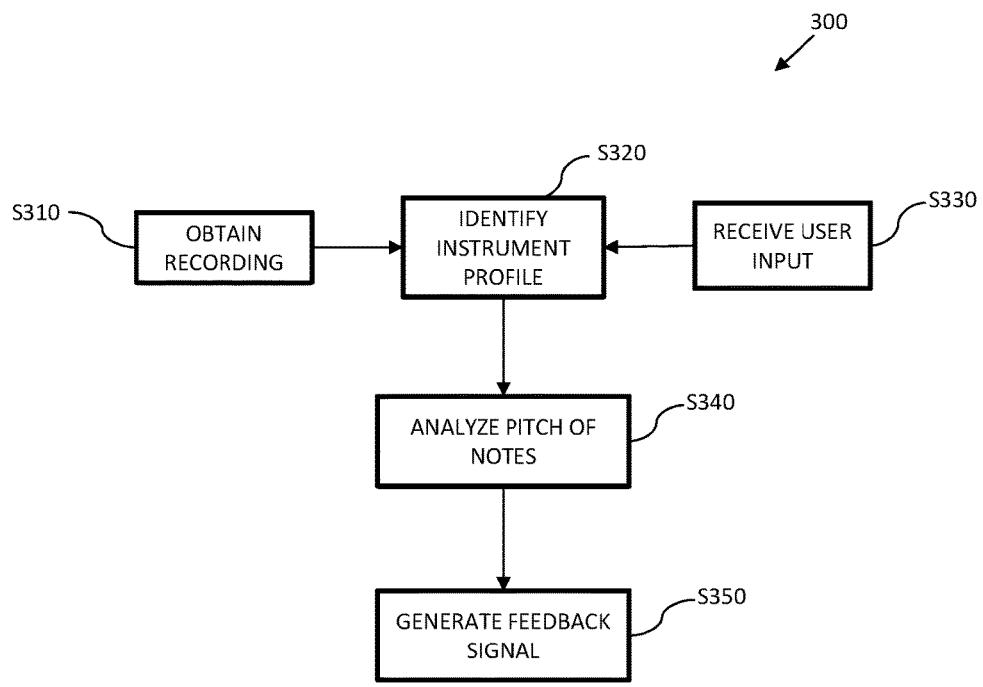
FIG. 3 is a simplified flow diagram of a method according to an embodiment.

Referring to FIG. 3, there is depicted a flow diagram of a method 300 according to an exemplary embodiment. The method 300 of this example is for providing feedback on a musical performance performed with a trumpet.

In step 310, a recording of the musical performance is obtained. Here, any suitable digital audio recording arrangement may be employed to generate a digital recording of the musical performance.

In step 320, a profile identification unit identifies an instrument profile associated with the musical instrument used to perform the musical performance. In doing so, step 320 may process the digital recording with an instrument recognition algorithm which is adapted to identify the musical instrument used to perform the musical performance. An instrument profile comprising information relating tuning characteristics of the identified instrument may then be retrieved (e.g. from an internal or external data store). Thus, in this example, step 320 identifies that the musical instrument is a brass instrument (namely a trumpet) and the retrieved instrument profile comprises information relating tuning characteristics of the brass instrument.

Some embodiments may, however, comprise the step 330 of receiving a user input indicative of the instrument used to perform the musical performance. Thus, it will be understood that proposed embodiments may be adapted to either identify the musical instrument by analyzing the digital recording and/or by obtaining information identifying the instrument (e.g. provided by a user or with the digital recording (such as within an instrument description header field of the digital recording).

Step 340 comprises analyzing the pitch of notes of the musical performance based on the instrument profile so as to determine a measure of tuning of the musical performance. The process 340 of analyzing the digital recording as depicted in FIG. 3 may comprise a plurality of differing (sub-)process, each of which may be used to generate a separate measure of tuning, as described in FIGS. 4-7.

Finally, in step 350, a feedback signal is generated based on the determined measure(s) of tuning from step 340. By way of example, the feedback signal may be based on the first to fourth measures of tuning, and so may include information about recommendations relating to: the whether the instrument is flat; the tuning of the upper and/or lower register of the instrument; and whether a break or warm-up may be advised. In this way, recommendations may be made to the performer based on the recorded musical performance.

Figure 4:
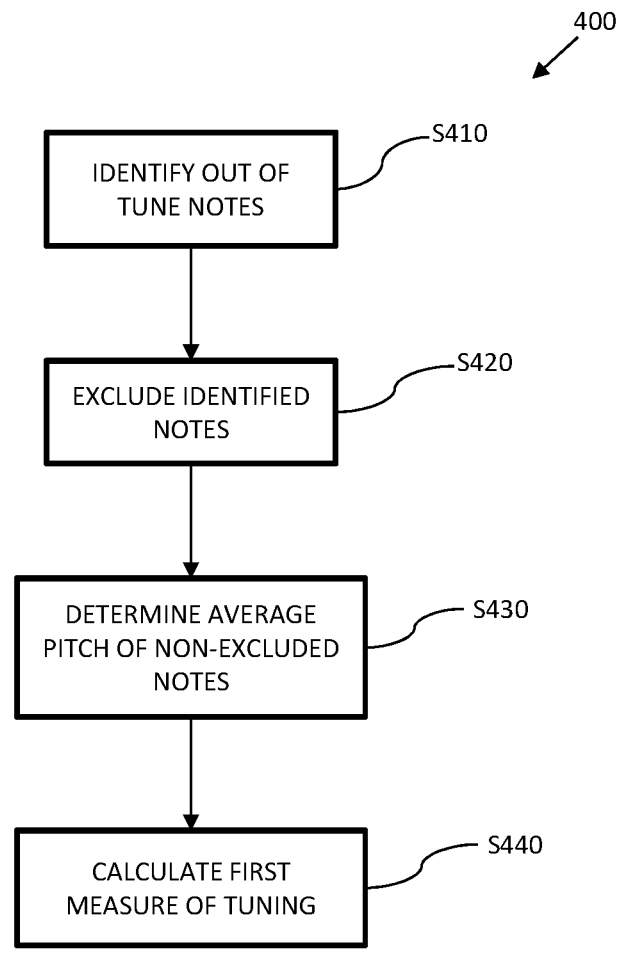
FIG. 4 is a portion of a simplified flow diagram of a method according to an embodiment.

Referring to FIG. 4, there is depicted a flow diagram of a method 400, a sub-process of method 300 of FIG. 3 according to an exemplary embodiment. The method 400 of this example is for analyzing the pitch of notes of the musical performance based on the instrument profile so as to determine a measure of tuning of the musical performance.

For example, a first sub-process may be used to determine a first measure of tuning of the musical performance based on an average pitch. Such a first sub-process may comprise the step 410 of identifying notes of the musical performance that are described as commonly out of tune notes by the instrument profile. Then in step 420, the identified notes of the musical performance may be excluded (e.g. ignored, removed or flagged as excluded from the musical performance). Step 430 may then comprise determining an average pitch of the non-excluded notes of the musical performance. Finally, in step 440, a first measure of tuning of the musical performance may be calculated based on the determined average pitch (from step 430). Here, it is noted that the step 430 of determining an average pitch may employ a weighting concept by applying a weighting values to the non-excluded notes based factor including: a timing of the non-excluded note (e.g. more recent notes may be given a higher weighting); whether the non-excluded note is within a normal stave range (e.g. notes within the normal stave range may be given a higher weighting value); and a method of playing the non-excluded note (e.g. notes requiring a certain technique, such as open fingering for example, may be given a lower weighting value).

Thus, the first sub-process (method 400) may provide a first measure of tuning that is indicative of whether or not the musical instrument is flat.

Figure 5:
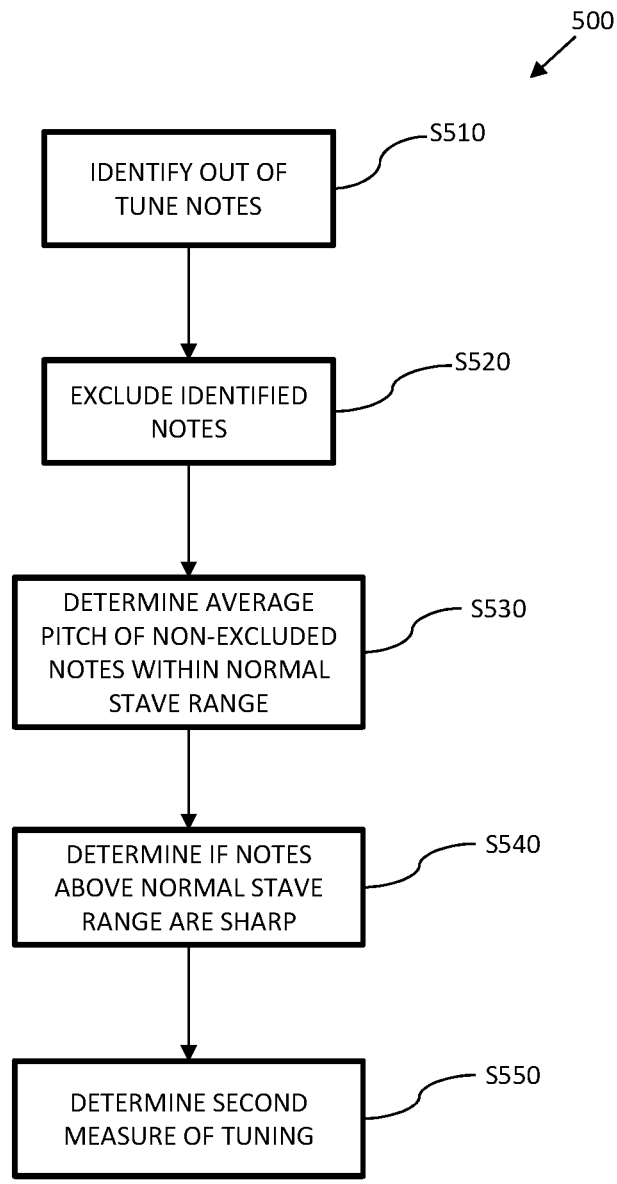
FIG. 5 is a portion of a simplified flow diagram of a method according to an embodiment.

Referring to FIG. 5, there is depicted a flow diagram of a method 500, a sub-process of method 300 of FIG. 3 according to an exemplary embodiment. The method 500 of this example is for analyzing the pitch of notes of the musical performance based on the instrument profile so as to determine a measure of tuning of the musical performance.

As depicted in FIG. 3, the process 340 of analyzing the digital recording may comprise a second sub-process which may be used to determine a second measure of tuning of the musical performance based notes above a normal stave range. Such a second sub-process may comprise the step 510 of identifying notes of the musical performance that are described as commonly out of tune notes by the instrument profile. Then in step 520, the identified notes of the musical performance that are described as commonly out of tune notes may be excluded (e.g. ignored, removed or flagged as excluded from the musical performance). Step 530 may then comprise determining an average pitch of non-excluded notes that are within a normal stave range. Then, based on the determined average pitch, step 540 may comprise determining if notes of the musical performance that are above the normal stave range are sharp. Finally, in step 550, a second measure of tuning of the musical performance may be determined based on the result of determining (from step 540) if notes of musical performance that are above the normal stave range are sharp.

Thus, the second sub-process (method 500) may provide a second measure of tuning that is indicative of a sharpness of the upper register of the instrument.

Figure 6:
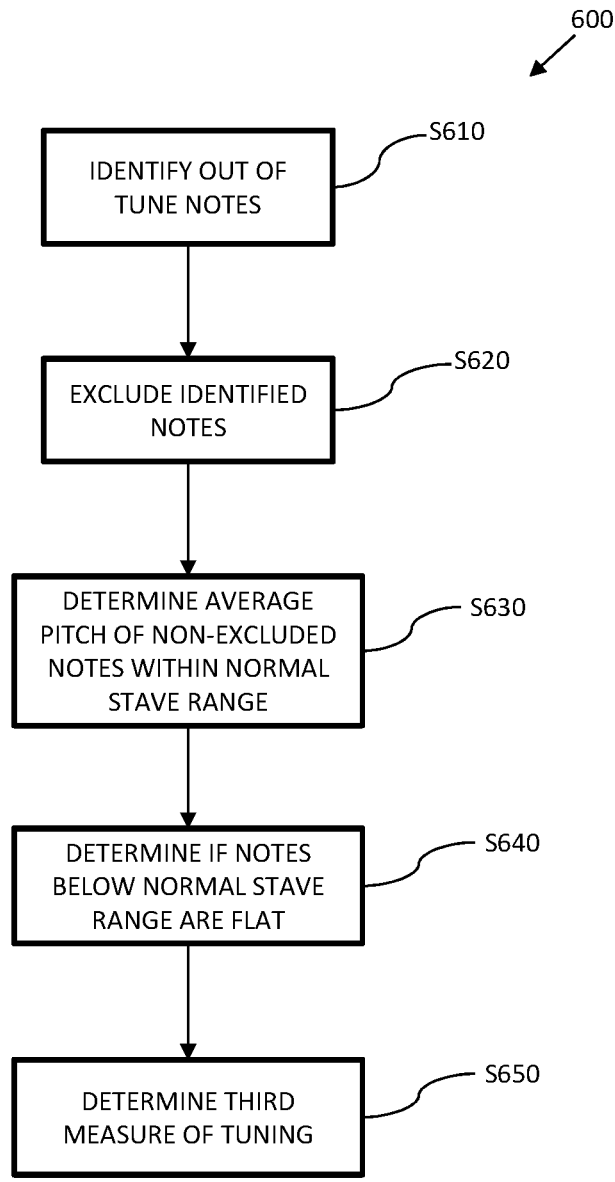
FIG. 6 is a portion of a simplified flow diagram of a method according to an embodiment.

Referring to FIG. 6, there is depicted a flow diagram of a method 600, a sub-process of method 300 of FIG. 3 according to an exemplary embodiment. The method 600 of this example is for analyzing the pitch of notes of the musical performance based on the instrument profile so as to determine a measure of tuning of the musical performance.

As depicted in FIG. 3, the process 340 of analyzing the digital recording may comprise a third sub-process which may be used to determine a third measure of tuning of the musical performance based notes below a normal stave range. Such a third sub-process may comprise the step 610 of identifying notes of the musical performance that are described as commonly out of tune notes by the instrument profile. Then, in step 620, the identified notes of the musical performance that are described as commonly out of tune notes may be excluded (e.g. ignored, removed or flagged as excluded from the musical performance). Step 630 may then comprise determining an average pitch of non-excluded notes that are within a normal stave range. Then, based on the determined average pitch, step 640 may comprise determining if notes of the musical performance that are below the normal stave range are flat. Finally, in step 650, a third measure of tuning of the musical performance may be determined based on the result of determining (from step 640) if notes of musical performance that are below the normal stave range are flat.

Thus, the third sub-process (method 600) may provide a third measure of tuning that is indicative of a flatness of the lower register of the instrument.

Figure 7:
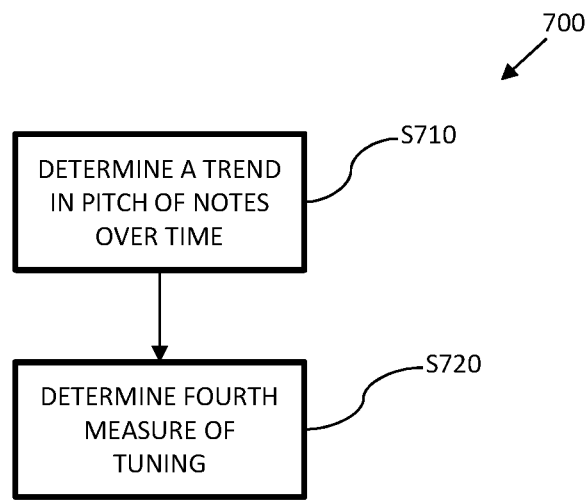
FIG. 7 is a portion of a simplified flow diagram of a method according to an embodiment.

Referring to FIG. 7, there is depicted a flow diagram of a method 700, a sub-process of method 300 of FIG. 3 according to an exemplary embodiment. The method 700 of this example is for analyzing the pitch of notes of the musical performance based on the instrument profile so as to determine a measure of tuning of the musical performance.

As depicted in FIG. 3, the process 340 of analyzing the digital recording may comprise a fourth sub-process which may be used to determine a fourth measure of tuning of the musical performance based on a trend in the pitch of notes of the musical performance over time. Such a fourth sub-process may comprise the step 710 of determining a trend in pitch of notes of the musical performance over time. Then, in step 720, based on the determined trend (from step 710), a fourth measure of tuning of the musical performance may be determined.

Thus, the fourth sub-process (method 700) may provide a fourth measure of tuning that is indicative of whether a break or warm-up may be advised (e.g. because the trend indicates that notes were becoming sharper and the instrument is being played in a cold room (thus indicating further warm-up may be needed), or because the trend indicates the note were becoming flatter (thus indicating a break may be needed).

To provide another example of how an embodiment may be implemented, an exemplary algorithm for method according to an embodiment may be described as follows:

(I) Use existing/conventional technology to capture audio of a musical performance an identify the note pitch being played and whether each note individually is in or out of tune;

(II) Record the notes being played and store the recorded notes in a database (recording their position in time and their fundamental frequency);

(III) Perform analysis on the notes stored in the database;

(a) Exclude commonly out of tune notes (low C#, low D, low E are all commonly sharp for a trumpet for example), and look at average pitch of remaining notes, giving a higher weighting to notes played more recently and notes played within the normal stave range and notes played on an open fingering. Based on this, make a recommendation about any overall tuning issue e.g. "Your trumpet is a little flat overall, push your tuning slide in"

(b) Using average pitch across good notes in the middle of the stave (so F, F#, G, Bb, B, C, C#, D for example) as the reference, check whether the upper range (above the stave) is comparatively sharp. If comparatively sharp, make a recommendation "Your upper register is sharp—are you pinching the higher notes?"

(c) Using the reference pitch from (III)(b), check whether the lower range (below middle C for example) is comparatively in tune (because these notes may be hard to form correctly). If not in tune, make recommendation "Your lower register below the stave is flat—be sure to support these notes with enough air."

(d) Look for changes in pitch over time and make recommendation based on if the notes are becoming flatter or shaper over time. If notes were becoming flatter, make recommendation "Over the last piece your notes were becoming flatter—do you need a break?". If note were becoming sharper, make recommendation "Over the last piece your notes were becoming sharper and you're in a cold room—do you need to finish warming your trumpet up?"

From the description provided above, it will be understood that proposed embodiments may identify issues with tuning of an instrument by analyzing a musical performance in conjunction which an instrument profile describing tuning characteristics of the instrument used for the musical performance. By way of example, such embodiments may extend a music performance and training feedback system by providing for expert system analysis of tuning and playing technique in consideration of instrument tuning characteristics.

In some embodiments, there may be provided a system comprising a processing arrangement adapted to carry out any method previously described with reference to FIGS. 1 to 7.

Figure 8:
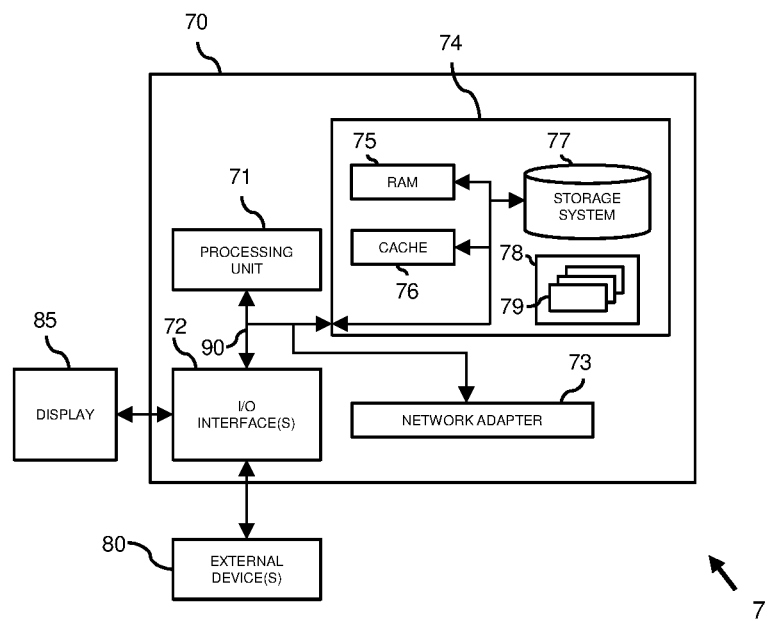
FIG. 8 illustrates a system for controlling access to protected information stored in a database according to an embodiment.

By way of example, as illustrated in FIG. 8, embodiments may comprise a computer system 70, which may form part of a networked system 7. The components of computer system/server 70 may include, but are not limited to, one or more processing arrangements, for example comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 77 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the invention.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the invention as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc. In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Some helpful definitions follow:

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

A "data communication" includes, but is not necessarily limited to, any sort of data communication scheme now known or to be developed in the future. "Data communications" include, but are not necessarily limited to: wireless communication; wired communication; and/or communication routes that have wireless and wired portions. A "data communication" is not necessarily limited to: (i) direct data communication; (ii) indirect data communication; and/or (iii) data communication where the format, packetization status, medium, encryption status, and/or protocol remains constant over the entire course of the data communication.

The term "real time" (and the adjective "real-time") includes any time frame of sufficiently short duration as to provide reasonable response time for information processing as described. Additionally, the term "real time" (and the adjective "real-time") includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

What is claimed is:

1. A computer program product for providing feedback on a musical performance performed with a musical instrument, the computer program product comprising a computer readable storage medium having program instructions embodied therewith, the program instructions executable by a processing unit to cause the processing unit to perform a method comprising:
   identifying an instrument profile associated with the musical instrument used to perform the musical performance, the instrument profile comprising information relating to one or more tuning characteristics of the instrument and including a description of commonly out of tune notes for the instrument;
   analyzing a pitch of notes of the musical performance based on the instrument profile to determine a measure of tuning of the musical performance comprising:
      identifying notes of the musical performance that are described as commonly out of tune notes by the instrument profile;
      excluding the identified notes of the musical performance;
      determining an average pitch of the non-excluded notes; and
      determining a first measure of tuning of the musical performance based on the determined average pitch; and
   generating a feedback signal based on the determined measure of tuning.

2. The computer program product of claim 1, wherein the musical instrument is a brass instrument, and wherein the instrument profile comprises information relating tuning characteristics of the brass instrument.

3. The computer program product of claim 1, wherein the step of determining an average pitch comprises applying a weighting value to a non-excluded note based on at least one of: a timing of the non-excluded note; whether the non-excluded note is within a normal stave range; and a method of playing the non-excluded note.

4. The computer program product of claim 1, wherein generating a feedback signal comprises:
   generating a first signal indicative of whether or not the musical instrument is flat based on the first measure of tuning.

5. The computer program product of claim 1, wherein:
   analyzing the pitch of notes of the musical performance further comprises:
      determining an average pitch of non-excluded notes that are within a normal stave range; and
      determining a first measure of tuning includes determining if notes of the musical performance that are above the normal stave range are sharp; and further comprising:
determining a second measure of tuning of the musical performance based on the result of determining if notes of musical performance that are above the normal stave range are sharp.

6. The computer program product of claim 5, wherein generating a feedback signal comprises:
generating a second signal indicative of a sharpness of an upper register based on the second measure of tuning.

7. The computer program product of claim 1, wherein:
analyzing the pitch of notes of the musical performance further comprises:
determining an average pitch of non-excluded notes that are within a normal stave range; and
determining a first measure of tuning includes determining if notes of the musical performance that are below the normal stave range are flat; and
further comprising:
determining a third measure of tuning of the musical performance based on the result of determining if notes of musical performance that are below the normal stave range are flat.

8. The computer program product of claim 7, wherein generating a feedback signal comprises:
generating a third signal indicative of a flatness of a lower register based on the third measure of tuning.

9. The computer program product of claim 1, wherein analyzing the pitch of notes of the musical performance further comprises:
determining a trend in pitch of a note of the musical performance over time; and
determining a fourth measure of tuning of the musical performance based on the determined trend.

10. The computer program product of claim 9, wherein generating a feedback signal comprises:
generating a fourth signal indicative of whether a break or warm-up may be advised based on the fourth measure of tuning.

11. A computer system for providing feedback on a musical performance performed with a musical instrument, the computer comprising:
a processor set; and
a computer readable storage medium;
wherein:
the processor set is structured, located, connected, and/or programmed to run program instructions stored on the computer readable storage medium; and
the program instructions which, when executed by the processor set, cause the processor set to provide feedback on the musical performance by:
identifying an instrument profile associated with the musical instrument used to perform the musical performance, the instrument profile comprising information relating to one or more tuning characteristics of the instrument and including a description of commonly out of tune notes for the instrument;
analyzing a pitch of notes of the musical performance based on the instrument profile to determine a measure of tuning of the musical performance including identifying notes of the musical performance that are described as commonly out of tune notes by the instrument profile;
excluding the identified notes of the musical performance;
determining an average pitch of the non-excluded notes; and
determining a first measure of tuning of the musical performance based on the determined average pitch; and
generating a feedback signal based on the determined measure of tuning.

12. The computer system of claim 11, wherein:
analyzing the pitch of notes of the musical performance further comprises:
determining an average pitch of non-excluded notes that are within a normal stave range; and
determining a first measure of tuning includes determining if notes of the musical performance that are above the normal stave range are sharp; and
further comprising:
determining a second measure of tuning of the musical performance based on the result of determining if notes of musical performance that are above the normal stave range are sharp.

13. The computer system of claim 12, wherein generating a feedback signal comprises:
generating a second signal indicative of a sharpness of an upper register based on the second measure of tuning.

14. The computer system of claim 11, wherein:
analyzing the pitch of notes of the musical performance further comprises:
determining an average pitch of non-excluded notes that are within a normal stave range; and
determining a first measure of tuning includes determining if notes of the musical performance that are below the normal stave range are flat; and
further comprising:
determining a third measure of tuning of the musical performance based on the result of determining if notes of musical performance that are below the normal stave range are flat.

15. The computer system of claim 14, wherein generating a feedback signal comprises:
generating a third signal indicative of a flatness of a lower register based on the third measure of tuning.

16. The computer system of claim 11, wherein the musical instrument is a brass instrument, and wherein the instrument profile comprises information relating tuning characteristics of the brass instrument.

17. The computer system of claim 11, wherein the step of determining an average pitch includes applying a weighting value to a non-excluded note based on at least one of:
a timing of the non-excluded note;
whether the non-excluded note is within a normal stave range; and
a method of playing the non-excluded note.

18. The computer system of claim 11, wherein generating a feedback signal comprises:
generating a first signal indicative of whether or not the musical instrument is flat based on the first measure of tuning.

19. The computer system of claim 11, wherein analyzing the pitch of notes of the musical performance further comprises:
determining a trend in pitch of a note of the musical performance over time; and
determining a fourth measure of tuning of the musical performance based on the determined trend.

20. The computer system of claim 19, wherein generating a feedback signal comprises:
   generating a fourth signal indicative of whether a break or warm-up may be advised based on the fourth measure of tuning.

\* \* \* \* \*